United States Patent
Furuichi et al.

(10) Patent No.: US 9,607,179 B2
(45) Date of Patent: Mar. 28, 2017

(54) PROVIDING DISPLAY CONTENT ACCORDING TO CONFIDENTIAL INFORMATION

(71) Applicant: International Business Machines Corporation, Armonk, NY (US)

(72) Inventors: Sanehiro Furuichi, Tokyo (JP); Akira Ohkado, Yokohama (JP); Tomohiro Shioya, Tokyo (JP); Masami Tada, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 26 days.

(21) Appl. No.: 14/706,565

(22) Filed: May 7, 2015

(65) Prior Publication Data

US 2015/0324553 A1 Nov. 12, 2015

(30) Foreign Application Priority Data

May 9, 2014 (JP) ................................ 2014-098084

(51) Int. Cl.
| | |
|---|---|
| *H04L 29/06* | (2006.01) |
| *G06F 21/84* | (2013.01) |
| *G06F 21/10* | (2013.01) |
| *H04L 29/08* | (2006.01) |

(52) U.S. Cl.
CPC .............. *G06F 21/84* (2013.01); *G06F 21/10* (2013.01); *H04L 67/10* (2013.01); *G06F 2221/0735* (2013.01)

(58) Field of Classification Search
CPC ........... G06F 21/84; G06F 21/10; H04L 67/10
USPC ........................................................ 726/26
See application file for complete search history.

(56) References Cited

U.S. PATENT DOCUMENTS

| | | | | |
|---|---|---|---|---|
| 8,347,395 | B2* | 1/2013 | Fischer | G06F 21/62 713/154 |
| 2006/0031779 | A1* | 2/2006 | Theurer | G06F 3/1454 715/781 |
| 2006/0200066 | A1* | 9/2006 | Fischer | G06F 21/62 604/20 |
| 2012/0162684 | A1 | 6/2012 | Matulic et al. | |

(Continued)

FOREIGN PATENT DOCUMENTS

| | | |
|---|---|---|
| JP | 2002149638 A | 5/2002 |
| JP | 2004185568 A | 7/2004 |

(Continued)

*Primary Examiner* — Michael S McNally
(74) *Attorney, Agent, or Firm* — Yee & Associates, P.C.; David Woycechowsky

(57) ABSTRACT

A method, system, and program to prevent leakage of confidential information included in a display content. A terminal device controls the displays of an internal display and an external display provided separately from the internal display. The terminal device includes a display control section which, when confidential information is included in an image to be displayed on the external display, causes the external display to display a substitute content instead of this image, and the internal display to display the image including the confidential information, and a confidential information processing section for performing processing on the confidential information included in the image displayed on the internal display by the display control section.

11 Claims, 13 Drawing Sheets

(56) References Cited

U.S. PATENT DOCUMENTS

| | | | | |
|---|---|---|---|---|
| 2012/0163269 A1* | 6/2012 | Shuster | ................ | H04W 4/206 370/312 |
| 2013/0167246 A1* | 6/2013 | Lee | ........................ | G06F 21/60 726/26 |
| 2015/0281255 A1* | 10/2015 | Watanabe | ............... | H04L 67/32 726/30 |

FOREIGN PATENT DOCUMENTS

| | | | |
|---|---|---|---|
| JP | 2004248241 | A | 9/2004 |
| JP | 2006171830 | A | 6/2006 |
| JP | 2006195668 | A | 7/2006 |
| JP | 2008262259 | A | 10/2008 |
| JP | 2009053393 | A | 3/2009 |
| JP | 2010079007 | A | 4/2010 |
| JP | 2010224736 | A | 10/2010 |
| JP | 2010256590 | A | 11/2010 |
| JP | 2011060000 | A | 3/2011 |
| JP | 2011061744 | A | 3/2011 |
| JP | 2012123736 | A | 6/2012 |

\* cited by examiner

PROVIDING DISPLAY CONTENT ACCORDING TO CONFIDENTIAL INFORMATION

CROSS-REFERENCE TO RELATED APPLICATION(S)

This application claims the benefit of priority to Japanese Patent Application No. 2014-098084, filed May 9, 2014, the entire contents of which are incorporated herein by reference.

TECHNICAL FIELD

The present invention relates to a device, system, method, and program for providing a display according to confidential information.

BACKGROUND ART

In recent years, the protection of confidential information has become an important issue in companies and the like, and techniques for preventing leakage of confidential information have been proposed. For example, Patent Literature 1 discloses a control technique in which, when copying a confidential document containing confidential information, an image of the confidential document is processed. Further, for example, Patent Literature 2 discloses a technique for allowing multiple portable terminals to download data selected by a portable terminal to which the host authority is given, and making all the portable terminals discard the data at the time of completion of presenting the data.

CITATION LIST

Patent Littératures

Patent Littérature 1
Japanese Patent Application Publication No. 2011-61744
Patent Literature 2
Japanese Patent Application Publication No. 2012-123736

SUMMARY OF INVENTION

Technical Problem

In the meantime, for example, upon giving a presentation, it is common practice to connect a user-operated terminal to an external display or a projector to show the same content to many people. At this time, if the user is not aware that confidential information is included in a display content and shows the display content as is on the external display or the like, the confidential information may leak.

It is an object of the present invention to prevent leakage of confidential information included in a display content.

Solution to Problem

In order to attain the above object, the present invention is implemented as the following device. This device includes: a display control section for controlling the displays of a first display section and a second display section provided separately from the first display section, and when confidential information is included in an image to be displayed in the second display section, causing the second display section to display a substitute image instead of the image and the first display section to display the image; and a confidential information processing section for performing processing on confidential information included in the image displayed in the first display section by the display control section.

It is preferred that, under certain conditions, the display control section causes the second display section to display, instead of the substitute image, the image after the confidential information is processed by the confidential information processing section.

It is more preferred that, when confidential information is included in an image to be displayed in the second display section, the display control section causes the first display section to display information indicative of the position of the confidential information in the image and a content of processing capable of being performed on the confidential information.

It is further preferred that this device further includes an input acceptance section for accepting input to specify a content of processing for confidential information when the confidential information is included in an image to be displayed in the second display section by the display control section.

It is further preferred that this device further includes a storage section for storing a database in which a confidentiality degree indicative of a degree of confidentiality is defined according to confidential information, and a confidentiality degree calculating section for calculating, for each confidential information based on the database, a degree of confidentiality of confidential information included in an image to be displayed in the second display section by the display control section to set the highest degree of confidentiality among calculated degrees of confidentiality as a degree of confidentiality of the image, wherein when the degree of confidentiality of the image calculated by the confidentiality degree calculating section is more than or equal to a predetermined threshold value, the display control section causes the second display section to display the substitute image instead of the image, while when the degree of confidentiality of the image is less than the predetermined threshold value, the display control section causes the second display section to display the image.

It is more preferred that the display control section causes the second display section to display a frame image indicative of a display area of the image as the substitute image.

It is further preferred that the display control section performs control to make the display of the first display section and the display of the second display section identical to each other, and when confidential information is included in an image to be displayed in the second display section, the display control section notifies a user to terminate a connection with the second display section.

The present invention is also implemented as the following device. This device includes: a storage section for storing a database in which a confidentiality degree indicative of a degree of confidentiality is defined according to confidential information; a confidentiality degree calculating section for calculating, for each confidential information based on the database, a degree of confidentiality of confidential information included in an image to set the highest degree of confidentiality among calculated degrees of confidentiality as a degree of confidentiality of the image; a display control section for controlling the displays of a first display section and a second display section provided separately from the first display section, and when a degree of confidentiality of an image to be displayed in the second display section and calculated by the confidentiality degree calculating section is more than or equal to a predetermined threshold value, causing the second display section to display a substitute image instead of the image and the first display section to display the image, while when the degree of confidentiality calculated by the confidentiality degree calculating section is less than the predetermined threshold value, causing the second display section to display the image; an input acceptance section for accepting input to specify a content of processing for confidential information included in the image displayed in the first display section by the display control section; and a confidential information processing section for performing processing on confidential information included in the image displayed in the first display section by the display control section based on the input accepted by the input acceptance section, wherein the substitute image is a frame image indicative of a display area of the image.

Further, the present invention is implemented as the following system. This system is a system in which a terminal device having a first display section and a display device having a second display section are connected, wherein the terminal device includes: a display control section for controlling the displays of the first display section and the second display section, and when confidential information is included in an image to be displayed in the second display section, causing the second display section to display a substitute image instead of the image and the first display section to display the image; and a confidential information processing section for performing processing on confidential information included in the image displayed in the first display section by the display control section.

The present invention further provides a method of causing a computer to control the displays of a first display section and a second display section connected to each other, the method including the steps of: detecting that an image is displayed in the second display section; when confidential information is included in the image to be displayed in the second display section, displaying a substitute image in the second display section instead of the image and displaying the image in the first display section; and performing processing on confidential information included in the image displayed in the first display section.

It is preferred that, when input is made to change the position of the image displayed in the first display section and display the image in the second display section, it is detected in the detection step that the image is displayed in the second display section.

Further, the present invention provides a program for causing a computer to implement: a function of controlling the displays of a first display section and a second display section provided separately from the first display section, and when confidential information is included in an image to be displayed in the second display section, causing the second display section to display a substitute image instead of the image and the first display section to display the image; and a function of performing processing on confidential information included in the image displayed in the first display section.

Effect of Invention

According to the present invention, leakage of confidential information included in a display content can be prevented.

DESCRIPTION OF EMBODIMENTS

Embodiments of the present invention will be described in detail below with reference to the accompanying drawings.

First Embodiment

Schematic Configuration of Entire System

Figure 1:
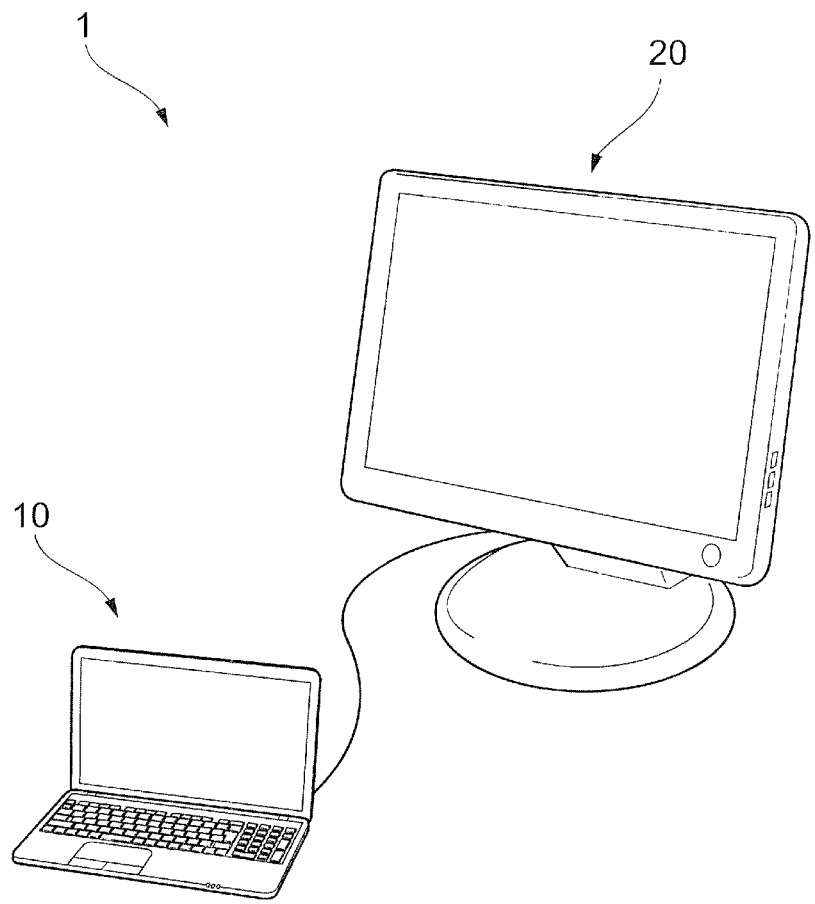
FIG. 1 is a diagram showing an example of a schematic configuration of a display system according to embodiments.

First, the general configuration of a display system 1 will be described. FIG. 1 is a diagram showing an example of a schematic configuration of the display system 1 according to the embodiment. As shown, the display system 1 according to the embodiment includes a terminal device 10 and a display device 20 connected to each other.

The terminal device 10 is a user-operated terminal, which corresponds to a PC (Personal Computer), for example. The terminal device 10 has a display (hereinafter called an internal display 11) for displaying various images. The terminal device 10 displays an image on the internal display 11 according to a user's operation and controls a display (hereinafter called an external display 21) on the display device 20. Here, when confidential information is included in a display content displayed on the external display 21, the terminal device 10 urges the user to edit the confidential information, and provides a display on the external display 21 after reflecting the content edited by the user. The confidential information is information to be prevented from leaking to the outside, such as customer information associated with business, own company's information that is not opened to other companies, and user's personal information. Here, when confidential information is included in a display content to be displayed on the external display 21, there are cases where only one piece of confidential information is included and two or more pieces of confidential information are included. In the embodiment, the internal display 11 is used as an example of a first display section. Further, the external display 21 is used as an example of a second display section.

The display device 20 is a device having the external display 21 for displaying various images, which is connected to the terminal device 10, for example, through a cable in conformity with a connection standard, such as D-Sub (D-subminiature) or HDMI (registered trademark) (High-Definition Multimedia Interface). Then, the display device 20 displays an image on the external display 21 under the control of the terminal device 10. Here, for example, the display device 20 corresponds to a liquid crystal display device or a plasma display device for PC or TV. A projector is also included as the display device 20. When the display device 20 is a projector, the screen of the external display 21 is an image plane on a screen to be displayed by the display device 20 (projector) projecting the image.

Further, as display methods for the internal display 11 and the external display 21, there are typically "duplicated display" and "extended display." The duplicated display is a method of making the internal display 11 and the external display 21 have the same display content. On the other hand, the extended display is a display method of handling the internal display 11 and the external display 21 as one virtual screen and allowing different images to be displayed on the internal display 11 and the external display 21. In the extended display, the internal display 11 and the external display 21 are handled as vertically one screen.

In other words, the terminal device 10 regards the screen of the internal display 11 and the screen of the external display 21 as one plane created on the same coordinate axes to determine an image display position. For example, when the user drags an image displayed on the internal display 11 using a mouse or the like, the coordinates of a position where the image is to be displayed are changed according to the drag operation. Then, for example, when the coordinates of the position where the image is to be displayed are changed by the drag operation from the coordinates on the screen of the internal display 11 to the coordinates on the screen of the external display 21, the image moves from the screen of the internal display 11 to the screen of the external display 21. In the embodiment, description will be made on the assumption that the extended display is set on the terminal device 10.

<Functional Configuration of Display System>

Figure 2:
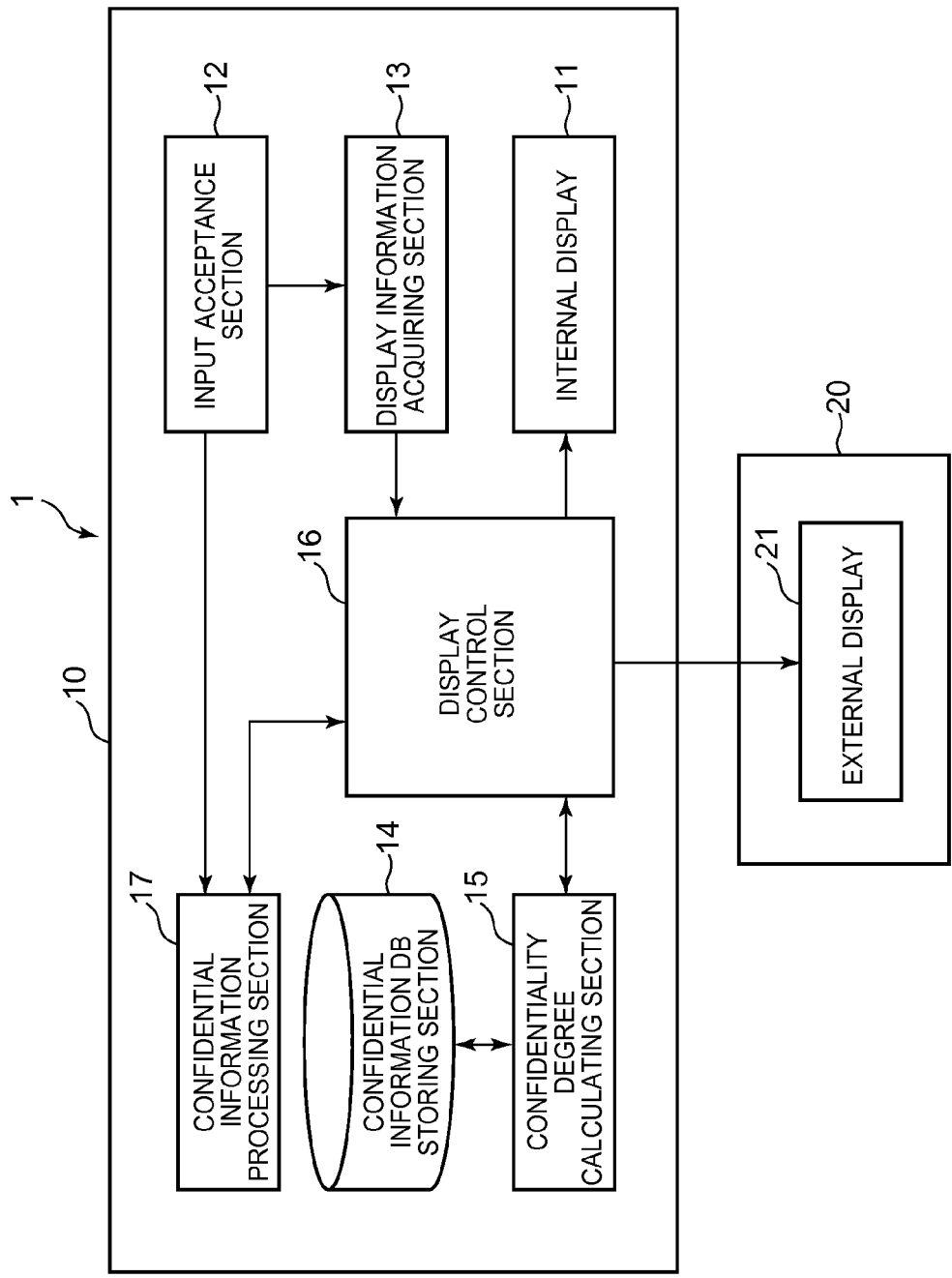
FIG. 2 is a block diagram showing a functional configuration example of the display system according to the embodiments.

Next, a functional configuration of the display system 1 will be described. FIG. 2 is a block diagram showing a functional configuration example of the display system 1 according to the embodiment.

The terminal device 10 includes the internal display 11 for displaying various images to the user, an input acceptance section 12 for accepting operation input from the user, and a display information acquiring section 13 for acquiring information on the displays of the internal display 11 and the external display 21. Further, the terminal device 10 includes a confidential information DB storing section 14 for storing a database (hereinafter called a confidential information DB) in which a degree of confidentiality is defined according to each confidential information, a confidentiality degree calculating section 15 for calculating the degree of confidentiality of a display content displayed on the external display 21, a display control section 16 for controlling the displays of the internal display 11 and the external display 21, and a confidential information processing section 17 for performing editing processing on the confidential information.

The internal display 11 displays various images to the user under the control of the display control section 16.

The input acceptance section 12 as an example of an input acceptance section accepts operation input from the user. Here, for example, the input acceptance section 12 accepts operation input for running an application to create a new document display window or operation input for moving a window displayed on the internal display 11 to display the window on the external display 21. Further, for example, the input acceptance section 12 accepts operation input for changing a page of the displayed image to the next page or operation input for editing confidential information. Such user's operation input is made, for example, by the user manipulating a mouse or a keyboard.

The display information acquiring section 13 acquires information on the displays of the internal display 11 the external display 21. Here, for example, the display information acquiring section 13 acquires information on a display content to be displayed on the internal display 11 or the external display 21, such as information on a document display window newly created by running an application or information on an image after page transition. Further, based on the operation input accepted by the input acceptance section 12, the display information acquiring section 13 acquires information on the layout of a display content, such as information indicating that the coordinates of a position where a window is to be displayed are changed to move the window from the screen of the internal display 11 to the screen of the external display 21, or information indicating that a page displayed on the external display 21 is changed. Then, the display information acquiring section 13 outputs these acquired pieces of information to the display control section 16. In addition, since the display information acquiring section 13 outputs the information on the display content and the information on the layout to the display control section 16, the displays of the internal display 11 and the external display 21 are controlled by the display control section 16 based on these pieces of information.

The confidential information DB storing section 14 as an example of a storage section stores a confidential information DB in which a degree of confidentiality is predefined for each confidential information according to the content of the confidential information. The degree of confidentiality is an index expressing a degree of confidentiality, for example, in percentage terms such that the number increases as the degree to be kept secret is higher. Specifically, a degree of confidentiality is registered in the confidential information DB in such a manner, for example, that 90 percent is given to information indicative of a company name, such as "Company A" or "B Co. Ltd.," as the degree of confidentiality, and 30 percent is given to information indicative of a money amount, such as "50,000,000 yen" or "one billion yen," as the degree of confidentiality.

In addition, for example, 10 percent may be registered for personal information such as a personal name as the degree of confidentiality, or the degree of confidentiality may be registered for each individual word in such a manner that 100 percent will be given to a word "confidential" as the degree of confidentiality. Further, for example, confidential information and the degree of confidentiality may be defined for each material, rather than to define confidential information common to all materials and a corresponding degree of confidentiality. In this case, in processing performed by the confidentiality degree calculating section 15 to be described below, when a material is displayed on the external display 21, information in the confidential information DB registered for the material is used to calculate a degree of confidentiality for each confidential information.

The confidentiality degree calculating section 15 as an example of a confidentiality degree calculating section calculates the degree of confidentiality of a display content to be displayed on the external display 21 under the display control of the display control section 16. Here, based on the confidential information DB stored in the confidential information DB storing section 14, the confidentiality degree calculating section 15 calculates the degree of confidentiality of the display content, for example, by DLP (Data Loss Prevention) as a conventional technique.

For example, when word information is included in data on a display content acquired by the display information acquiring section 13, the confidentiality degree calculating section 15 checks the word information against words of confidential information registered in the confidential information DB. Further, for example, when image information is included in the data on the display content acquired by the display information acquiring section 13, the confidentiality degree calculating section 15 performs image analysis to extract a word represented by the image in order to check the extracted word against words of confidential information registered in the confidential information DB. Further, for example, when an image representing a graphic or symbol is included in the data on the display content acquired by the display information acquiring section 13, the confidentiality degree calculating section 15 performs image analysis to check the image included in the display content against images of confidential information registered in the confidential information DB. As a result of the checking, when confidential information registered in the confidential information DB is included in the display content, the confidentiality degree calculating section 15 determines a degree of confidentiality of the confidential information based on the confidential information DB. Then, the confidentiality degree calculating section 15 calculates a degree of confidentiality of the entire display content based on the degrees of confidentiality of all pieces of confidential information included in the display content.

Here, when only one piece of confidential information is included in the display content, the confidentiality degree calculating section 15 sets the degree of confidentiality of the confidential information as the degree of confidentiality of the entire display content. On the other hand, when two or more pieces of confidential information are included in the display content, the confidentiality degree calculating section 15 sets, for example, the largest value among the degrees of confidentiality of the confidential information as the degree of confidentiality of the entire display content. Note that the procedure for determining the degree of confidentiality of the entire display content is not limited thereto, and a total value of the degrees of confidentiality of respective pieces of confidential information may be set, for example, as the degree of confidentiality of the entire display content.

The display control section 16 as an example of a display control section controls the displays of the internal display 11 and the external display 21 based on information on the displays acquired from the display information acquiring section 13. Further, the display control section 16 instructs the confidentiality degree calculating section 15 to calculate a degree of confidentiality on an image to be displayed on the external display 21. Then, the display control section 16 determines whether the degree of confidentiality calculated by the confidentiality degree calculating section 15 is more than or equal to a predetermined threshold value.

When the degree of confidentiality is more than or equal to the predetermined threshold value, the display control section 16 causes the external display 21 to display a substitute content instead of this image due to leaking of confidential information if the image is displayed as is on the external display 21. The substitute content is an image to be displayed on the external display 21 instead of a target image operated to be displayed on the external display 21, which is, for example, a frame image indicative of an area in which the image as the display target is to be displayed, such as an image of only a frame surrounding the image as the display target. Then, the display control section 16 causes the internal display 11 to display information indicative of the position of confidential information in the image and a proposed modification to the confidential information to present them to the user while displaying the substitute content on the external display 21. In the embodiment, the substitute content is used as an example of a substitute image.

When operation input for editing the confidential information is made by the user and the confidential information is edited, the display control section 16 causes the external display 21 to display an image after the editing processing. On the other hand, when the degree of confidentiality calculated by the confidentiality degree calculating section 15 is not more than or equal to the predetermined threshold value, the confidential information is not edited and the display control section 16 causes the external display 21 to display the image as is.

The confidential information processing section 17 as an example of a confidential information processing section performs editing processing on confidential information to be displayed on the external display 21. Here, the confidential information processing section 17 performs editing processing to reflect a user's modification content based on user's operation input for editing the confidential information. As the editing processing for the confidential information, processing for blackening out the confidential information, hatching the confidential information, replacing the confidential information with another word(s), or the like can be considered.

The display device 20 has the external display 21, and the external display 21 displays various images under the control of the display control section 16 of the terminal device 10. Here, when editing processing for confidential information is performed, the external display 21 displays an image after the editing processing. Further, when control is performed by the display control section 16 to display a substitute content, the external display 21 displays the substitute content.

<Screen to be Displayed on Each Display>

Figure 3:
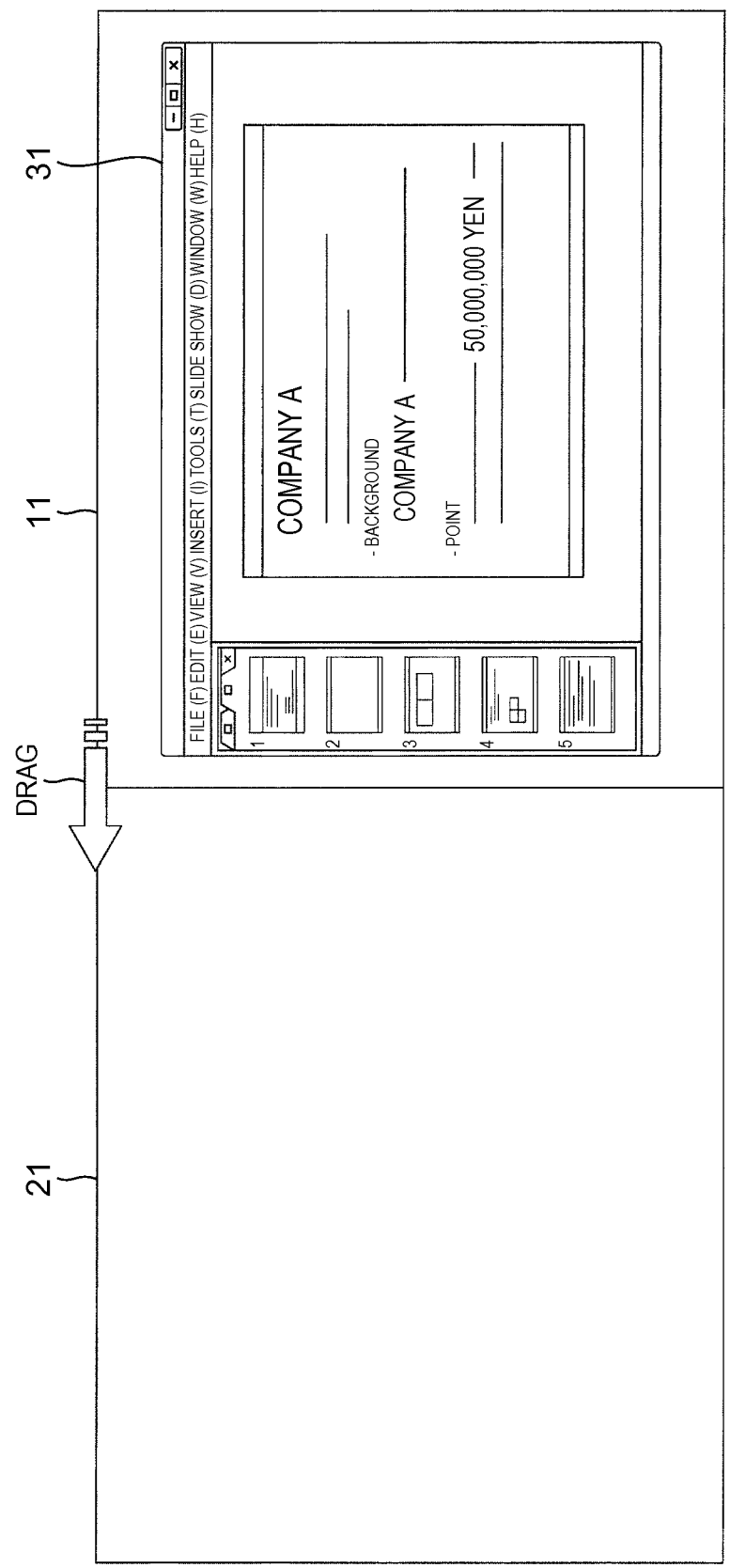
FIG. 3 is a diagram for describing an example of screens when a window displayed on an internal display is moved to an external display.
Figure 4:
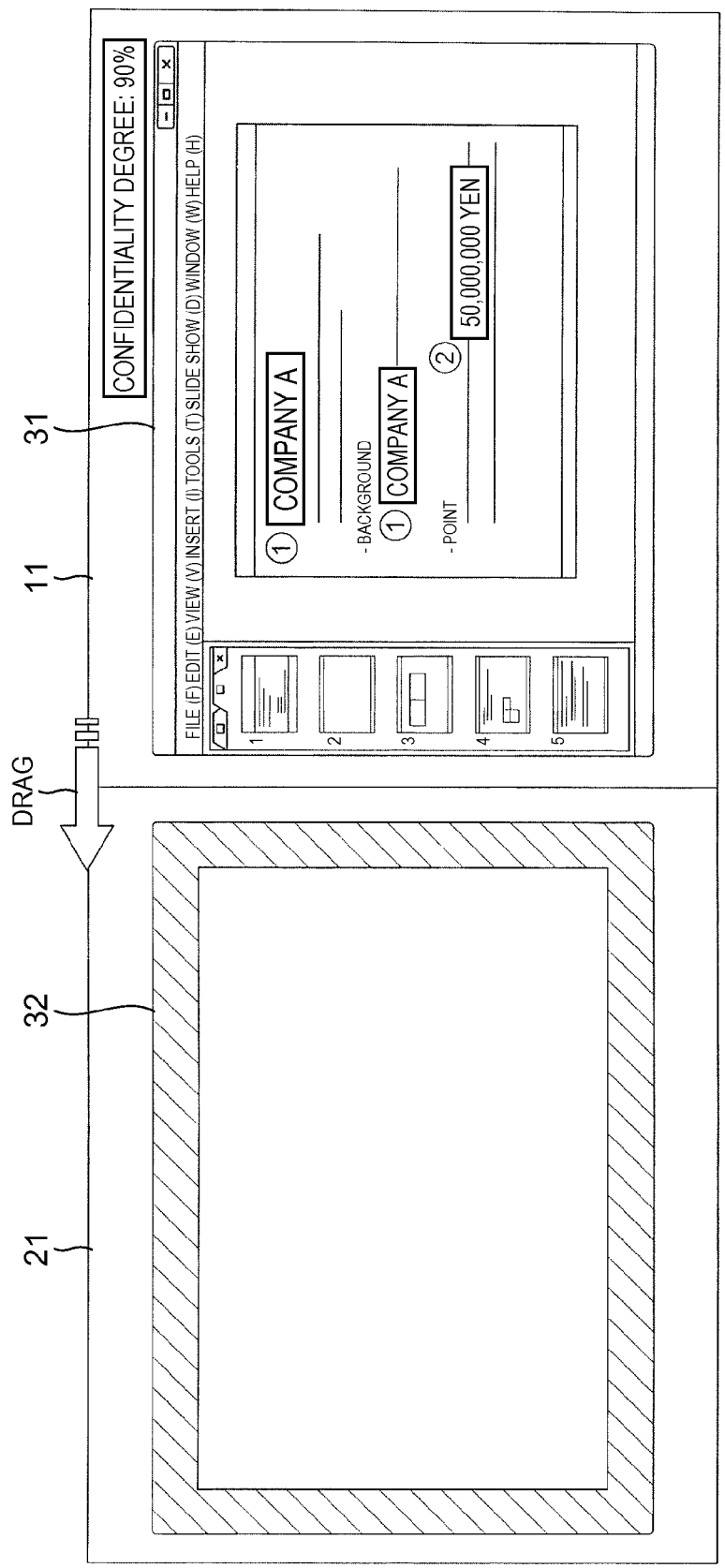
FIG. 4 is a diagram for describing the example of screens when the window displayed on the internal display is moved to the external display.

Next, screens to be displayed on the internal display 11 and the external display 21 will be described. FIG. 3 and FIG. 4 are diagrams for describing an example of screens when a window displayed on the internal display 11 is moved to the external display 21.

In the example shown in FIG. 3, a document display window 31 created by running an application is displayed on the internal display 11. Here, information including another company name "Company A" and information including a money amount "50,000,000 yen" are included in the window 31 as confidential information. On the other hand, nothing is displayed thus far on the external display 21.

Then, for example, when the user drags the window 31 to display the window 31 on the external display 21, the confidentiality degree calculating section 15 calculates a degree of confidentiality for the window 31 in accordance with an instruction from the display control section 16. Here, for example, the display control section 16 may instruct the confidentiality degree calculating section 15 when the drag operation is carried out, or when the window 31 is moved by the drag operation and an edge of the window 31 is first displayed on the external display 21.

When the degree of confidentiality of the window 31 is calculated, the display control section 16 determines whether the calculated degree of confidentiality of the window 31 is more than or equal to the predetermined threshold value. In the example shown in FIG. 3, the confidentiality degree calculating section 15 determines that the degree of confidentiality of "Company A" to be 90 percent and the degree of confidentiality of "50,000,000 yen" to be 30 percent based on the confidential information DB to make such a calculation that the highest 90 percent is set to the degree of confidentiality of the entire window 31.

When 90 percent is not more than or equal to the predetermined threshold value, the window 31 is displayed as is on the external display 21. On the other hand, when 90 percent is more than or equal to the predetermined threshold value, a substitute content is displayed on the external display 21. Here, for example, it is assumed that, when even a part of the window 31 crosses the border between the coordinates within the screen of the internal display 11 and the coordinates within the screen of the external display 21 by the drag operation, the substitute content is displayed instead of the window 31. In other words, even when the part of the window 31 is moved into the screen of the external display 21 and the remaining part of the window 31 is still present within the screen of the internal display 11, the substitute content is displayed instead of the window 31.

Further, in the example shown in FIG. 4, only a hatched frame 32 is displayed on the external display 21 as the substitute content. For example, the frame 32 is the same in size as the window 31. Here, for example, when the user drags the window 31 to the external display 21, the window 31 including the confidential information is not displayed, and further, if the substitute content is also not displayed, it will be hard for the user to determine whether processing in response to the drag operation is performed on the terminal device 10. Therefore, providing a display of the substitute content makes it easy for the user to determine that the processing in response to the drag operation is performed. Further, the display of the confidential information on the external display 21 is prevented. In addition, the substitute content is displayed, and this allows other users viewing the external display 21 to recognize that some kind of display is being prepared.

In addition, the window 31 that was moved is redisplayed on the internal display 11 in the position before being moved while displaying the frame 32 on the external display 21. Note that, as shown in FIG. 4, information indicative of the position of the confidential information in the window 31 is displayed as a result of performing the operation for moving the window 31 to the external display 21. In the example shown in FIG. 4, each confidential information is enclosed by a line and a number is assigned to each confidential information. In other words, "No. 1" is assigned to two "Company A" showing the same content, and "No. 2" is assigned to "50,000,000 yen." Thus, the position of each confidential information is clearly specified by enclosing the confidential information by the line and assigning a number to the confidential information. Although only the information indicative of the position of the confidential information is displayed in the window 31 shown in FIG. 4, a proposed modification to the confidential information is also displayed in practice. A screen showing the proposed modification to the confidential information will be described later with reference to FIG. 7.

As the information indicative of the position of the confidential information, the confidential information may also be painted with a color. In this regard, the color may be changed according to the degree of confidentiality of the confidential information. For example, it is considered that confidential information that is confidential information but not so important because of a low degree of confidentiality is painted with a faint color, and confidential information with a high degree of confidentiality is painted with a deep color.

Further, when determining that there is no need to keep the content in the window 31 secret, the user may, for example, drag the window 31 to a specific position to cancel the display of the frame 32 and display the dragged window 31 as is on the external display 21. The case of dragging the window 31 to the specific position is, for example, a case where the window 31 is so moved that the pointer of the mouse (a portion selected by the user on the window 31 to move the window 31) will touch an end opposite to the right end of the external display 21 on the border with the internal display 11 in FIG. 3 or FIG. 4 (i.e., the left end of the external display 21), or the like.

Figure 5:
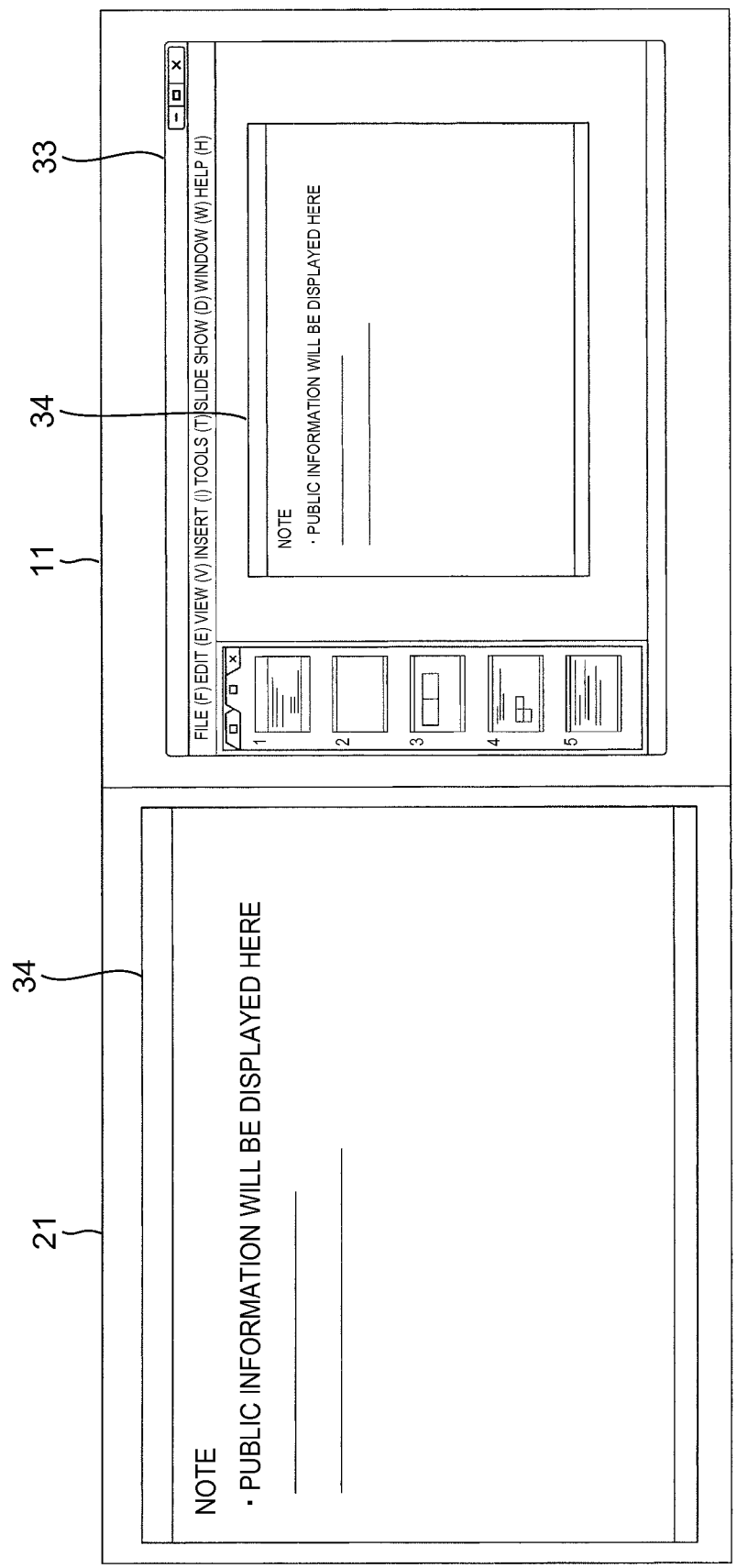
FIG. 5 is a diagram for describing an example of screens when a page of an image displayed on the external display is changed.
Figure 6:
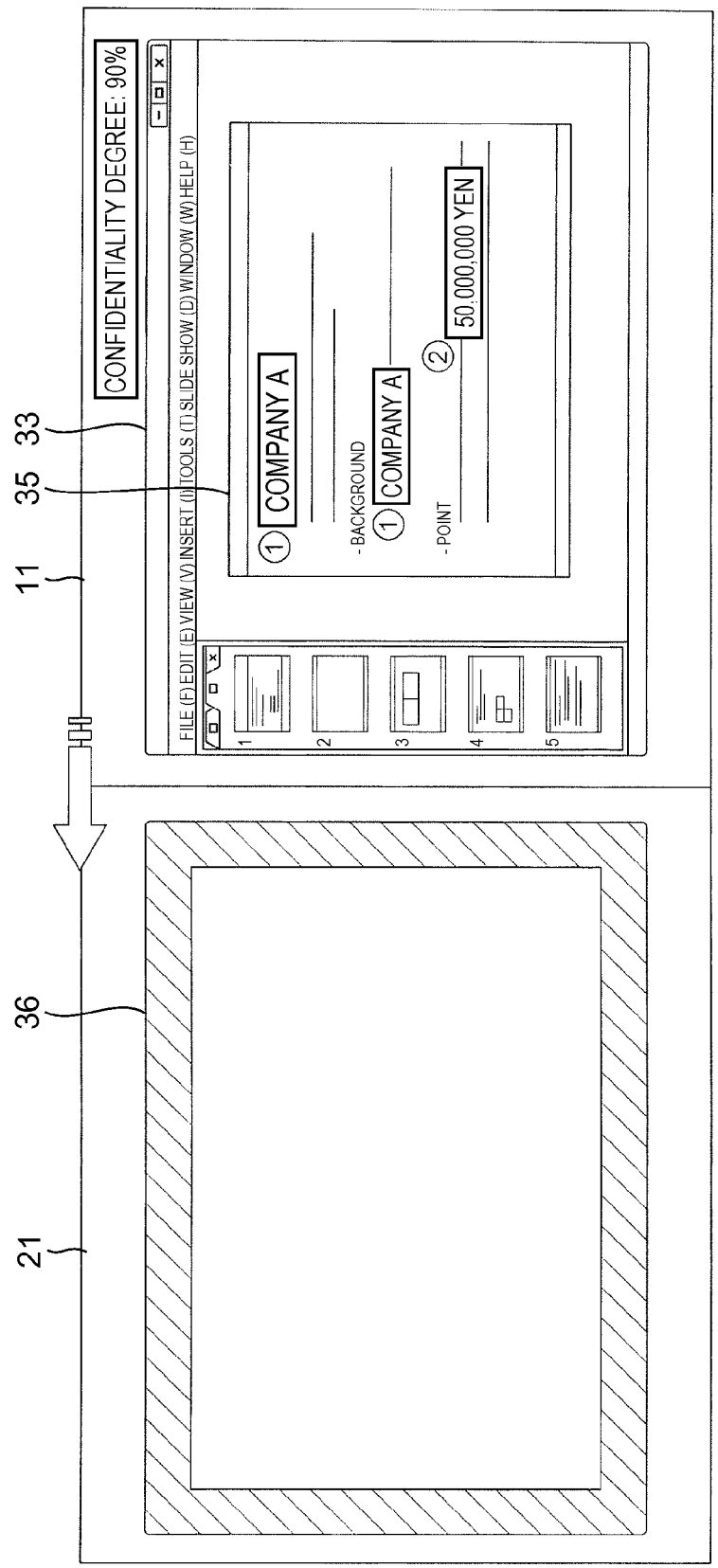
FIG. 6 is a diagram for describing the example of screens when a page of an image displayed on the external display is changed.

Next, FIG. 5 and FIG. 6 are diagrams for describing an example of screens when a page of an image displayed on the external display 21 is changed.

In the example shown in FIG. 5, a document display window 33 created by running the application is displayed on the internal display 11. In the window 33, a page image 34 as an image of a page selected from among multiple pages is displayed. On the other hand, a display in a presentation mode is provided on the external display 21. The presentation mode is a display mode used when the user makes a presentation, where only an image of the page part to be described in the presentation is displayed, for example. Then, the page image 34 selected by the terminal device 10 is displayed on the external display 21 shown in FIG. 5. Here, no confidential information is included in the page image 34, and no editing processing is performed on confidential information.

Next, when the input acceptance section 12 accepts operation input for changing pages, the page of the page image 34 on the internal display 11 and the external display 21 are changed to transition destination pages. Here, the display control section 16 causes the internal display 11 to display a transition destination page. Further, since a new image, i.e., an image of a transition destination page is to be displayed on the external display 21, the display control section 16 instructs the confidentiality degree calculating section 15 to calculate a degree of confidentiality. Then, based on the instruction from the display control section 16, the confidentiality degree calculating section 15 calculates a degree of confidentiality on a display content of the transition destination page. When the degree of confidentiality of the transition destination page is calculated, the display control section 16 determines whether the calculated degree of confidentiality is more than or equal to a predetermined threshold value. In the example shown in FIG. 6, since operation input for changing from the page of the page image 34 to the page of a page image 35 is made, the display control section 16 determines whether the degree of confidentiality of the page image 35 calculated by the confidentiality degree calculating section 15 is more than or equal to the predetermined threshold value.

Like in the case of the window 31 shown in FIG. 4, if the degree of confidentiality of the page image 35 is 90 percent, the page image 35 will be displayed as is on the external display 21 instead of the page image 34 unless 90 percent is more than or equal to the predetermined threshold value. On the other hand, when 90 percent is more than or equal to the predetermined threshold value, a substitute content is displayed on the external display 21. In the example shown in FIG. 6, only a hatched frame 36 is displayed as the substitute content. It is assumed, for example, that the frame 36 has the same size as the page image 35 in the presentation mode. The substitute content is displayed in this way, and this makes it easy for the user to figure out that processing corresponding to a page transition operation is being performed on the terminal device 10, and further prevents a display of confidential information on the external display 21. In addition, displaying the substitute content allows other users viewing the external display 21 to recognize that it is in preparation for some kind of display.

Further, the page image 35 of the transition destination page is displayed on the internal display 11 while displaying the frame 36 on the external display 21. Note that information indicative of the position of each confidential information is displayed in the page image 35 as shown in FIG. 6 as a result of performing the operation for changing pages. Here, like in the window 31 shown in FIG. 4, only the information indicative of the position of each confidential information is displayed in the page image 35 shown in FIG. 6, but a proposed modification to the confidential information is also displayed in practice.

<Coping with Confidential Information>

Figure 7:
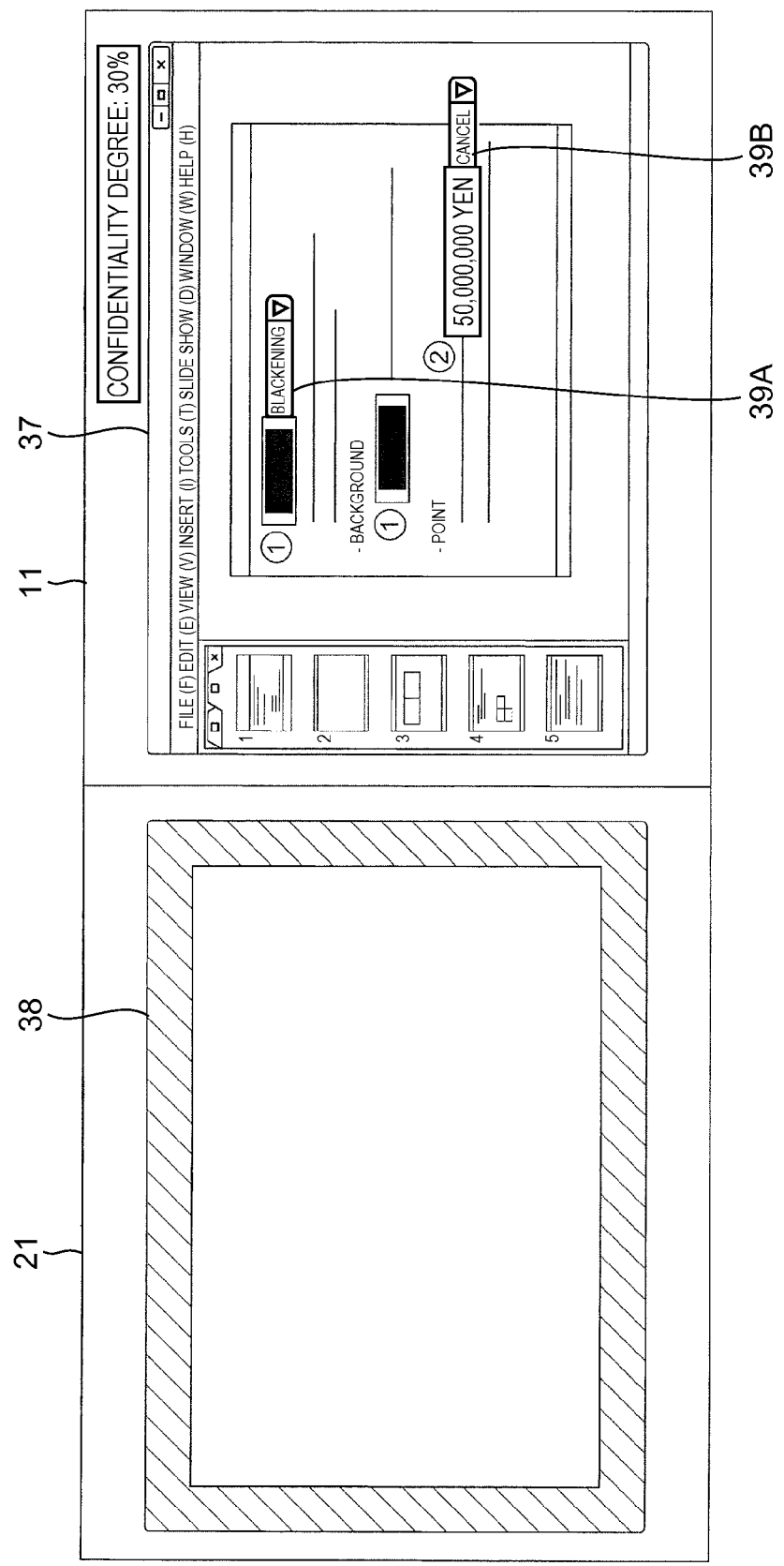
FIG. 7 is a diagram for describing an example of screens when processing is performed on confidential information.

Next, processing for confidential information will be described. FIG. 7 is a diagram for describing an example of screens when processing is performed on confidential information.

A window 37 including confidential information is displayed on the internal display 11 shown in FIG. 7. Further, only a hatched frame 38 is displayed on the external display 21 as a result of performing processing for moving the window 37 to the external display 21, processing for changing to a page including confidential information in the presentation mode, and the like. Then, a proposed modification to each confidential information is displayed in the window 37 of the internal display 11 as processing for the confidential information together with information indicative of the position of the confidential information. Further, the processing such as to paint the confidential information with black or the like is performed on the confidential information.

Like in the window 31 shown in FIG. 4, "No. 1" is assigned to two pieces of confidential information and "No. 2" is assigned to confidential information representing "50,000,000 yen" in the window 37 shown in FIG. 7. The content of the confidential information assigned each number in FIG. 7 is the same as that shown in FIG. 4. Further, a combo box is provided next to each confidential information to specify a content of editing processing for the confidential information. The combo box is a combination of a text box for entering a word(s) and an item selection list.

Then, in the example shown in FIG. 7, a combo box 39A is provided next to the first "No. 1" confidential information from the top of the window 37, and a combo box 39B is provided next to "50,000,000 yen" as the "No. 2" confidential information. Further, "blackening" is selected in the combo box 39A as the editing processing for the confidential information, and processing for blackening out the two pieces of confidential information is performed. Further, "cancel" is selected in the combo box 39B as the editing processing for the confidential information, where the confidential information of "50,000,000 yen" is not edited. Thus, the contents of editing processing for confidential information are specified by the user, and the editing processing is performed based on the specified contents.

When editing processing for each confidential information is performed, since the degree of confidentiality of the display content diminishes, the display control section 16 determines once again whether the degree of confidentiality is more than or equal to the predetermined threshold value. Then, when the degree of confidentiality is not more than or equal to the predetermined threshold value, a display content after the editing processing is displayed on the external display 21. Here, for example, when the degree of confidentiality is not more than or equal to the predetermined threshold value, the display content after the editing processing is displayed on the external display 21 by the user's operation input. Further, for example, when the degree of confidentiality becomes no longer more than or equal to the predetermined threshold value, the display content after the editing processing may be displayed on the external display 21 automatically without user's operation input.

Like the window 31 shown in FIG. 4, although the degree of confidentiality of the window 37 shown in FIG. 7 is 90 percent before the editing processing for the confidential information, since confidential information to be displayed is only "50,000,000 yen" as a result of blackening out the "No. 1" confidential information, the degree of confidentiality of the window 37 is reduced to 30 percent. Therefore, if 30 percent is not more than or equal to the predetermined threshold value, the window 37 after the editing processing will be displayed on the external display 21 instead of the frame 38.

<Another Example of Substitute Content>

Figure 8B:
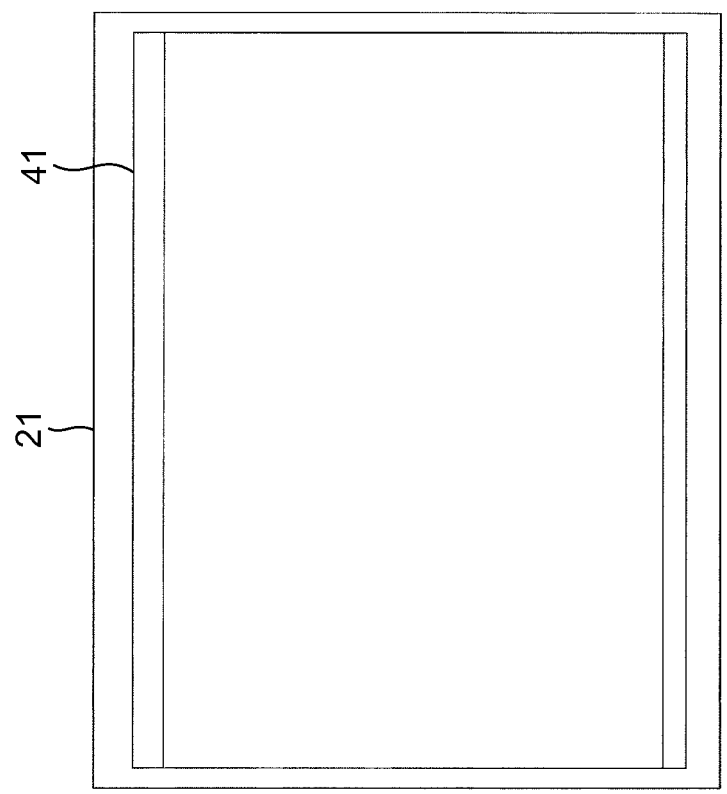
FIG. 8A and FIG. 8B are diagrams for describing an example of screens using a template as a substitute content.
Figure 8A:
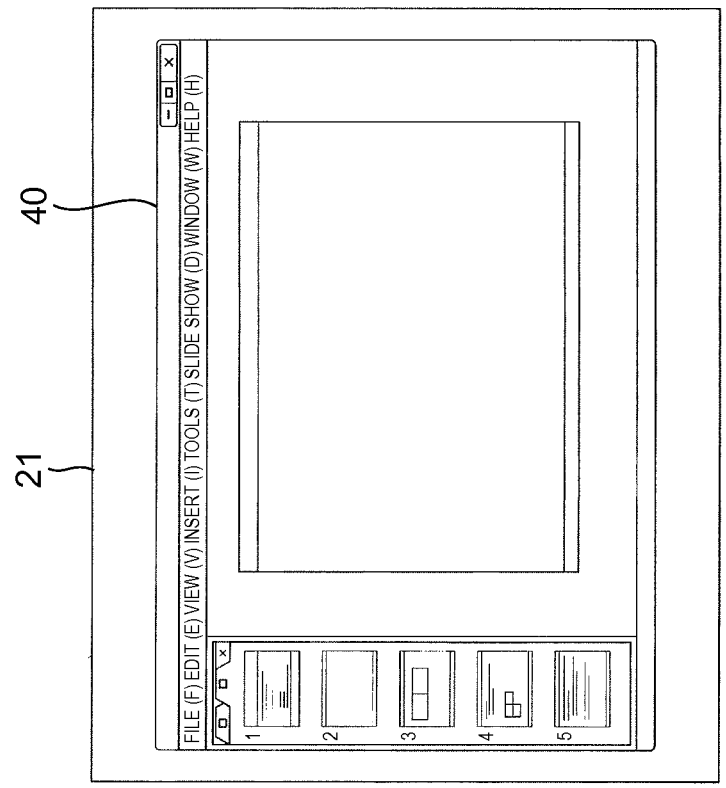

In the examples shown in FIG. 3 to FIG. 7, a frame enclosing an image to be displayed is used as a substitute content, but the substitute content is not limited thereto. For example, the display control section 16 may display a template with words and the like as its content removed therefrom as the substitute content on a page to be displayed in the document display window created by the application or in the presentation mode. FIGS. 8A and 8B are diagrams for describing an example of screens using a template as the substitute content.

Here, FIG. 8A is a diagram showing an example of the substitute content to be displayed when the window 33 shown in FIG. 6 is dragged to the external display 21. A substitute content 40 shown in FIG. 8A is a content in which words and the like in the page image 35 of the page selected in the window 33 are removed. FIG. 8B is a diagram showing an example of the substitute content displayed when an operation for changing to the page image 35 shown in FIG. 6 is performed in the presentation mode. A substitute content 41 shown in FIG. 8B is a content in which words and the like in the page image 35 are removed. Note that it is preferred not to include confidential information in the substitute content, and if confidential information is included in a template, the template will not be used as the substitute content. Further, for example, a part obtained by removing the page image 35 from the window 33 shown in FIG. 6, i.e., only the frame of the application that has created the window 33 may be used as the substitute content.

Thus, the use of the frame image as the substitute content allows other users viewing the external display 21 to get information on the size and form of an image the display of which is in preparation, the type of application, and the like.

The substitute content is not limited to the frame image. For example, an image including a message for informing the other users that it is in preparation for some kind of display may also be used. In this case, for example, if a message saying "Please wait" is displayed, the other users viewing the external display 21 can more surely recognize that it is in preparation for some kind of display.

<Display Processing for External Display>

Figure 9:
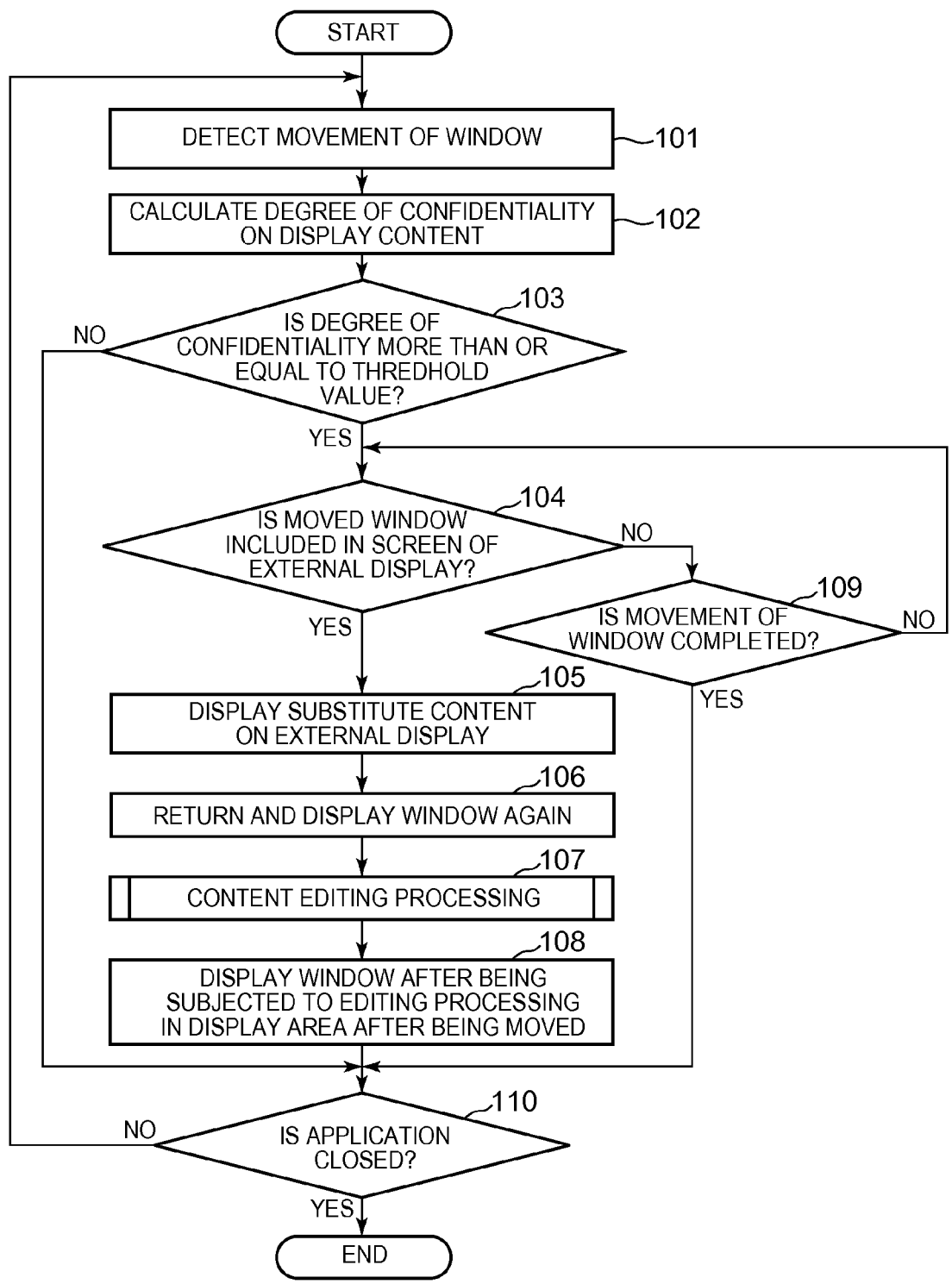
FIG. 9 is a flowchart showing an example of a procedure when a window displayed on the internal display is moved.
Figure 10:
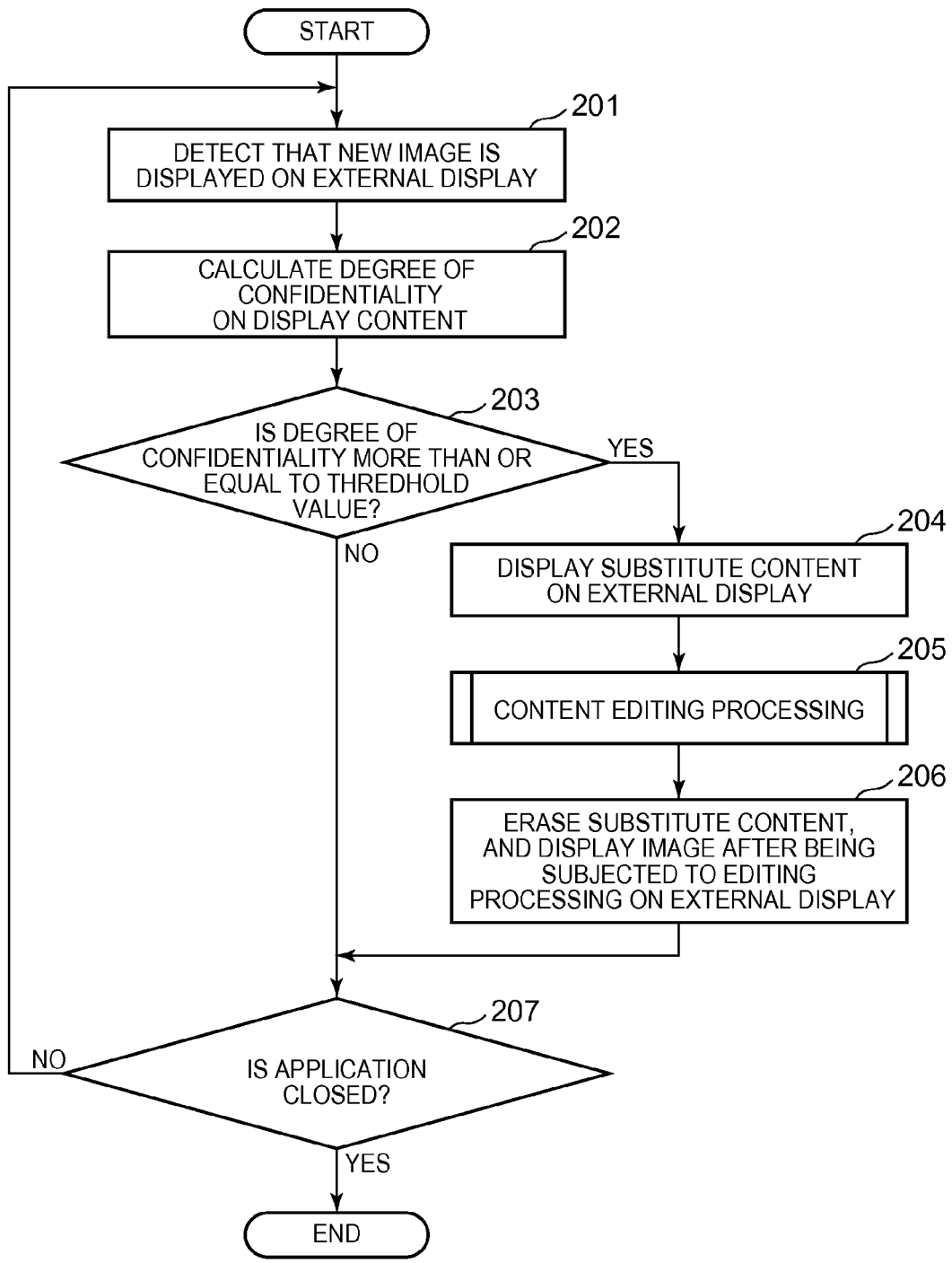
FIG. 10 is a flowchart showing an example of a procedure when an image is newly displayed on the external display in a presentation mode.

Referring next to FIG. 9 and FIG. 10, processing when an image is displayed on the external display 21 will be described. FIG. 9 is a flowchart showing an example of a procedure when a window displayed on the internal display 11 is moved. In the procedure shown in FIG. 9, it is assumed that the user first drags a window displayed on the internal display 11, and the degree of confidentiality is calculated when the drag operation is performed.

First, the display information acquiring section 13 detects the movement of the window displayed on the internal display 11 based on operation input from the user (step 101). Then, the display information acquiring section 13 outputs information on the movement of the window to the display control section 16. Next, the confidentiality degree calculating section 15 calculates a degree of confidentiality on a display content of the moved window based on an instruction from the display control section 16 (step 102). Next, the display control section 16 determines whether the calculated degree of confidentiality is more than or equal to a predetermined threshold value (step 103).

When the degree of confidentiality is more than or equal to the predetermined threshold value (Yes in step 103), the display control section 16 determines, based on information from the display information acquiring section 13, whether there is an image to be newly displayed on the external display 21 as a result of the movement of the window, i.e., whether the moved window is included in the screen of the external display 21 (step 104). When the moved window is included in the screen of the external display 21 (Yes in step 104), the display control section 16 causes the external display 21 to display a substitute content (step 105).

Here, for example, the display control section 16 displays only a window-sized frame in an area where the moved window is to be displayed within the external display 21. Further, when the window is dragged to move within the screen of the external display 21, the display control section 16 moves the substitute content according to the drag operation. Then, upon completion of the drag operation, the display control section 16 returns and displays the window again in the area where the window was displayed in the internal display 11 before the movement (step 106).

Next, processing for editing confidential information in a window (hereinafter, a series of processing operations for editing confidential information are called content editing processing) are performed to edit confidential information (step 107). A detailed procedure for the content editing processing will be described later with reference to FIG. 10. Next, after the confidential information is edited in the content editing processing, the display control section 16 displays, instead of the substitute content, a window after the editing processing in an area where the window after being moved is displayed within the external display 21 (step 108).

When determining in step 104 that the moved window is not included in the screen of the external display 21 (No in step 104), the display control section 16 determines whether the operation for moving the window is completed (step 109). When the operation for moving the window is not completed (No in step 109), the procedure returns to step 104. Further, when it is determined in step 103 that the degree of confidentiality is not more than or equal to the predetermined threshold value (No in step 103), when the operation for moving the window is completed in step 109 (Yes in step 109), or after the window is displayed on the external display 21 in step 108, processing is performed depending on whether the application that created the window is closed (step 110). In other words, the processing from step 101 to step 109 is repeated (No in step 110) until the application is closed. On the other hand, when the application is closed (Yes in step 110), this processing flow is ended.

Thus, when a window is moved from the screen of the internal display 11 and displayed on the screen of the external display 21, a substitute content will be displayed on the external display 21 if confidential information included in the window fulfills certain conditions and, thus, cannot be displayed as is on the external display 21. Then, after editing processing is performed on the confidential information, a display content after the editing processing is displayed on the external display 21.

Although the case where a window is moved is described in the procedure shown in FIG. 9, a case where the size of a window is changed, rather than the movement of a window, processing is also performed in a procedure similar to that in FIG. 9. In this case, for example, when the user clicks the mouse on an edge of the window displayed on the internal display 11 to make the window resizable, and moves the edge of the window to the external display 21, the window is made bigger, resulting in the display of a new image on the external display 21. Further, for example, when a window already displayed on the external display 21 is resized to make the window bigger, an image previously not displayed may be displayed on the external display 21.

FIG. 10 is a flowchart showing an example of a procedure when an image is newly displayed on the external display 21 in the presentation mode. In the procedure shown in FIG. 10, it is assumed that an operation for newly displaying an image on the external display 21 is first performed by the user. Here, the case where an image is newly displayed on the external display 21 in the presentation mode is, for example, a case where pages are changed in the presentation, where the first page is displayed, where a new image is inserted by animation, where a character string is newly added into a page, or the like.

First, the display information acquiring section 13 detects that an image is newly displayed on the external display 21, for example, by changing pages based on operation input from the user, and acquires information on the image to be displayed (step 201). Then, the display information acquiring section 13 outputs, to the display control section 16, information on the page transition and the information on the image to be newly displayed. Next, based on an instruction from the display control section 16, the confidentiality degree calculating section 15 calculates a degree of confidentiality on a display content of the image to be newly displayed (step 202). Then, the display control section 16 determines whether the calculated degree of confidentiality is more than or equal to a predetermined threshold value (step 203).

When the degree of confidentiality is more than or equal to the predetermined threshold value (Yes in step 203), the display control section 16 causes the external display 21 to display a substitute content (step 204). Here, for example, the display control section 16 displays only a frame in an area where the new image is to be displayed within the external display 21. Then, content editing processing for confidential information in the image is performed to edit the confidential information (step 205). After the confidential information is edited in the content editing processing, the display control section 16 erases the substitute content displayed on the external display 21, and causes the external display 21 to display an image after the editing processing (step 206).

When it is determined in step 203 that the degree of confidentiality is not more than or equal to the predetermined threshold value (No in step 203), or after the image is displayed on the external display 21 in step 206, processing is performed depending on whether an application that has displayed images in the presentation mode is closed (step 207). In other words, the processing from step 201 to step 206 is repeated (No in step 207) until the application is closed. On the other hand, when the application is closed (Yes in step 207), this processing flow is ended.

Thus, when an image is newly displayed on the external display 21 in the presentation mode, a substitute content is displayed on the external display 21 if confidential information included in the image to be newly displayed fulfills certain conditions and, thus, cannot be displayed as is on the external display 21. Then, after editing processing is performed on the confidential information, a display content after the editing processing is displayed on the external display 21.

<Content Editing Processing>

Figure 11:
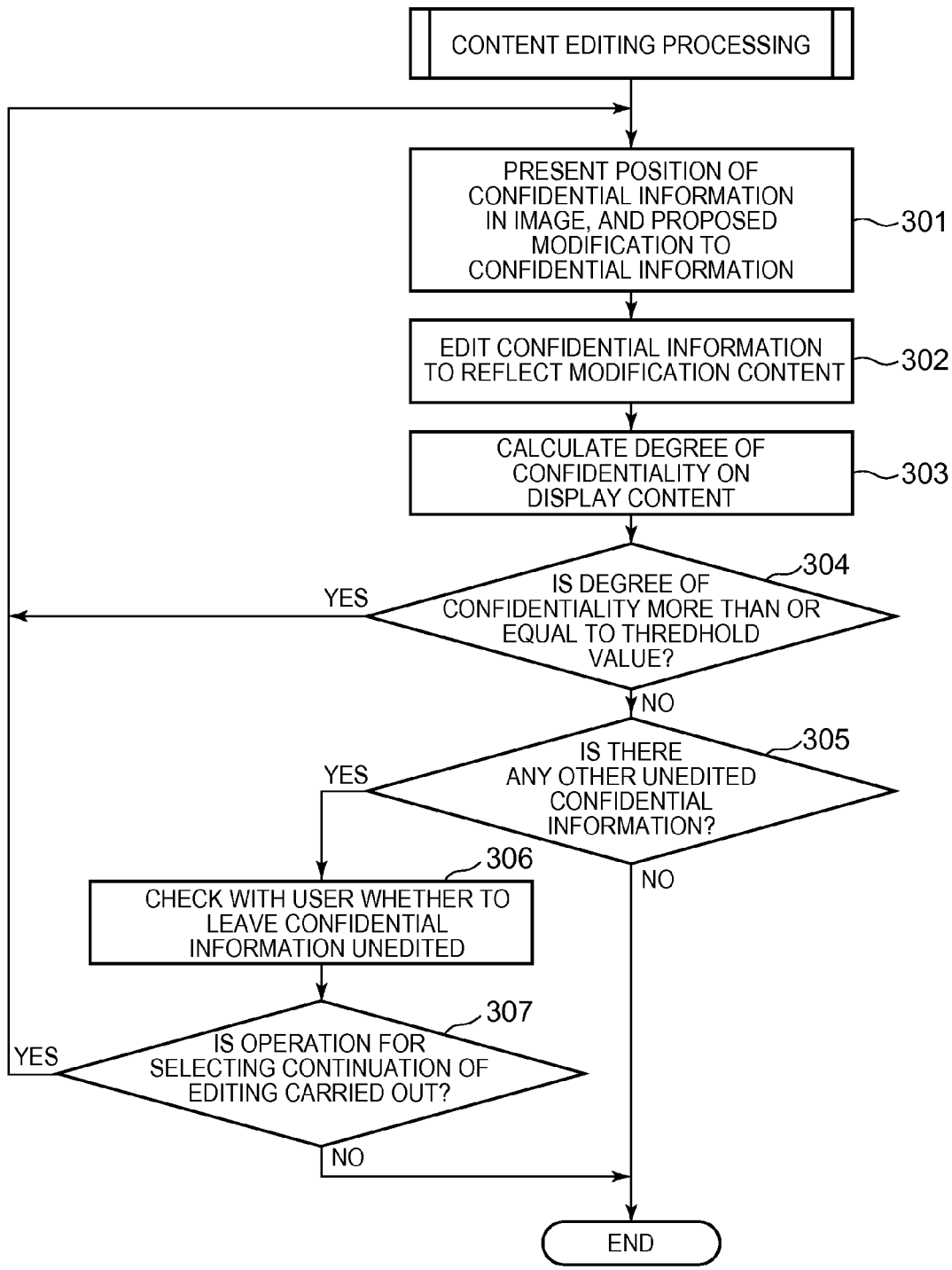
FIG. 11 is a flowchart showing an example of a procedure for content editing processing.

Next, the content editing processing will be described. FIG. 11 is a flowchart showing an example of a procedure for the content editing processing.

First, the display control section 16 causes the internal display 11 to display information on the position of confidential information in an image including the confidential information, and a proposed modification to the confidential information to present them to the user (step 301). Next, when operation input is made by the user to specify a content of modification to the confidential information, the confidential information processing section 17 edits the confidential information to reflect the modification content specified by the user based on the operation input (step 302).

Next, the confidentiality degree calculating section 15 calculates a degree of confidentiality on the display content of an image after the editing processing for the confidential information (step 303). Then, the display control section 16 determines whether the calculated degree of confidentiality is more than or equal to a predetermined threshold value (step 304). When the degree of confidentiality is more than or equal to the predetermined threshold value (Yes in step 304), the procedure returns to step 301 in which the display control section 16 presents the information on the position of the confidential information and the proposed modification to the confidential information again to the user to make a request to the user for operation input.

On the other hand, when the degree of confidentiality is not more than or equal to the predetermined threshold value (No in step 304), the display control section 16 next determines whether there is any other unedited confidential information in the image (step 305). When there is no unedited confidential information (No in step 305), this processing flow is ended. After completion of the processing flow, an image after the editing processing for confidential information is displayed on the external display 21.

On the other hand, when there is any unedited confidential information (Yes in step 305), the display control section 16 checks with the user whether to leave the confidential information unedited (step 306). Here, for example, the display control section 16 causes the internal display 11 to display a message for urging the user to select whether to leave the confidential information unedited in order to perform processing for urging the user to make a selection. Next, based on operation input from the user, the display control section 16 determines whether an operation for selecting the continuation of editing of the confidential information is carried out (step 307). When the operation for selecting the continuation of editing is carried out (Yes in step 307), the procedure returns to step 301. On the other hand, when the operation for selecting the continuation of editing is not carried out (No in step 307), it means that it is OK to leave the confidential information unedited, and this processing flow is ended.

Thus, the terminal device 10 accepts a content of modification specified by the user as content editing processing for confidential information included in an image to be displayed on the external display 21, and performs editing processing for the confidential information. Then, when unedited confidential information is no longer present or when the user does not desire the continuation of editing of confidential information, the content editing processing is ended.

As described above, the terminal device 10 according to the embodiment determines whether confidential information is included in a display content of the external display 21, and when the degree of confidentiality of the display content is more than or equal to a predetermined threshold value, the terminal device 10 causes the external display 21 to display a substitute content. Further, information indicative of the position of confidential information and a proposed modification to the confidential information are displayed on the internal display 11. Then, when the user enters a content of modification to the confidential information, editing processing for the confidential information is performed, and a display content after the editing processing is displayed on the external display 21.

Therefore, for example, even if the user performs an operation for displaying an image on the external display 21 without being aware that confidential information is included in the image, this will end up displaying a substitute content on the external display 21, preventing leakage of the confidential information. Further, displaying the substitute content makes it easy for the user to determine that processing in response to a user's operation such as the drag operation or the page transition operation is being performed. Further, other users viewing the external display 21 can recognize that it is in preparation for some kind of display. In addition, displaying the substitute content allows the user to spend a little time coping with the confidential information. Since the user can perform editing processing on the confidential information such as blackening using the terminal device 10 operated by the user, information is opened as far as possible without leakage of the confidential information.

Although in the presentation mode the current pages are displayed on the internal display 11 and the external display 21, there may be a case where the next page is displayed in the corner of the internal display 11 to make it easy for the user to make a presentation. In this case, the terminal device 10 in the embodiment determines whether confidential information is included in the next page before the operation for changing to the next page. If the degree of confidentiality is more than or equal to the predetermined threshold value, the terminal device 10 can also urge the user to perform editing processing on the confidential information. The user can perform the editing processing on the next page in advance not to display a substitute content on the external display 21 upon page transition in order to display a display content after the editing processing. This enables the audience not to be kept waiting because the substitute content is displayed, advancing the presentation smoothly.

Second Embodiment

Next, a second embodiment will be described. In the first embodiment, the extended display is set as the display method, while in this embodiment, the duplicated display is set as the display method. A display system 1 according to this embodiment has the same configuration as that of the display system 1 according to the first embodiment, and the same components as those in the first embodiment are given the same reference numerals to omit the detailed description thereof.

Figure 12:
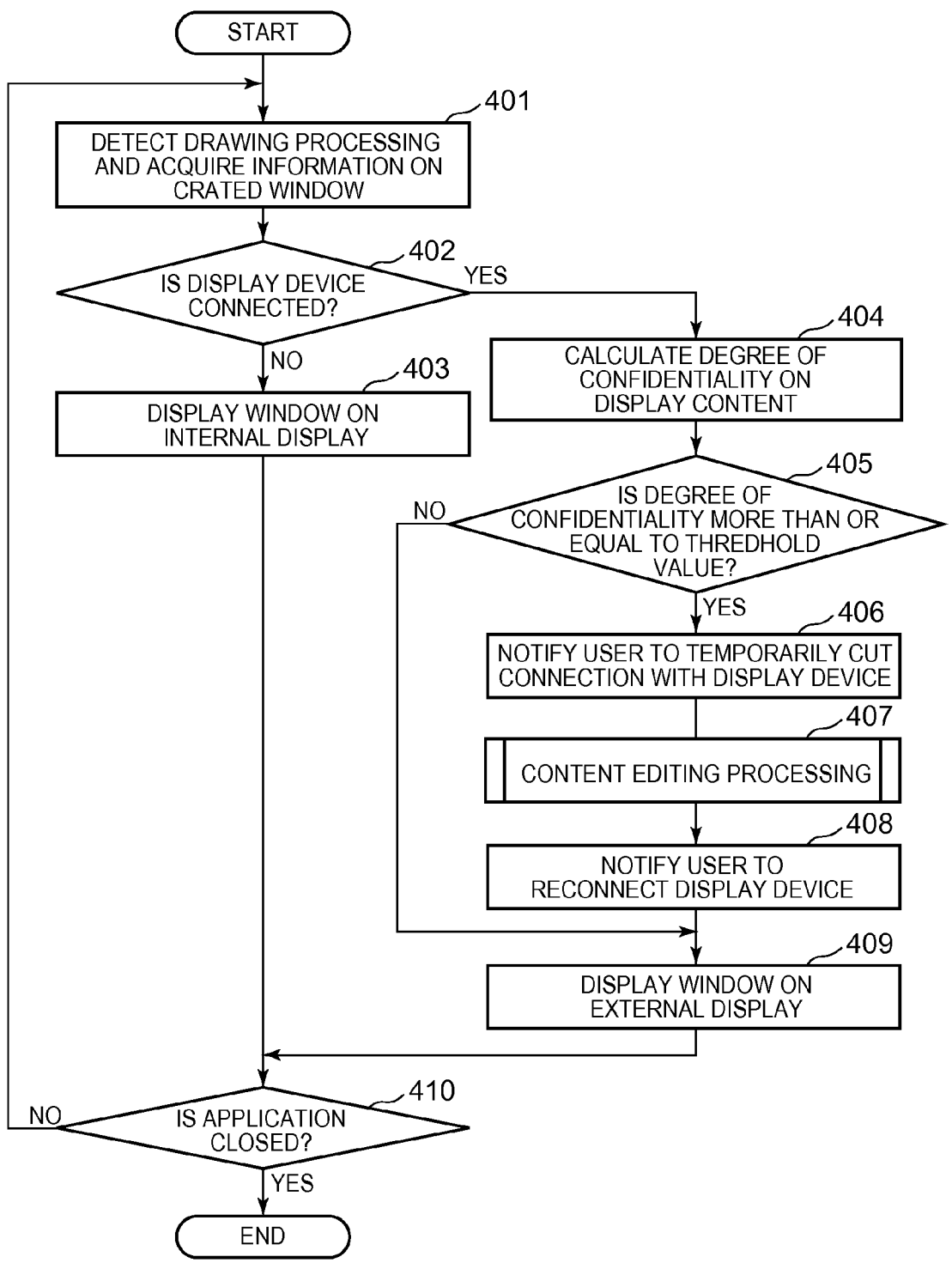
FIG. 12 is a flowchart showing an example of a procedure when an image is displayed on the external display in a duplicated manner.

FIG. 12 is a flowchart showing an example of a procedure when an image is displayed on the external display 21 in a duplicated manner. In the procedure shown in FIG. 12, it is assumed that an application is first run on the terminal device 10 to create a document display window in order to perform processing for drawing a window by the application.

First, when the application is run to create the document display window and processing for drawing a window is performed, the display information acquiring section 13 detects the drawing processing by the application, and acquires information on the created window (step 401). Next, the display control section 16 determines whether the display device 20 having the external display 21 is connected to the terminal device 10 (step 402). When the display device 20 is not connected (No in step 402), the display control section 16 causes the internal display 11 to display the window based on the information acquired from the display information acquiring section 13 (step 403).

On the other hand, when the external display 21 is connected (Yes in step 402), then the confidentiality degree calculating section 15 calculates a degree of confidentiality on a display content of the created window (step 404). Next, the display control section 16 determines whether the calculated degree of confidentiality is more than or equal to a predetermined threshold value (step 405). In the case of duplicated display, the display content of the internal display 11 is identical to the display content of the external display 21. Therefore, when the degree of confidentiality is more than or equal to the predetermined threshold value (Yes in step 405), the display control section 16 notifies the user to temporarily cut the connection with the display device 20 without displaying the window on the internal display 11 (step 406).

Here, for example, the display control section 16 displays, on the internal display 11, a message that the connection with the display device 20 is to be terminated to notify the user of that effect. Further, the display control section 16 causes the internal display 11 and the external display 21 to display a substitute content such as a frame until the connection with the display device 20 is terminated. In the embodiment, the message that the connection with the display device 20 is to be terminated can also be regarded as an example of the substitute content.

Then, when the connection with the display device 20 is terminated, content editing processing is next performed to edit confidential information (step 407). After the confidential information is edited in the content editing processing, the display control section 16 notifies the user to reconnect the display device 20 (step 408). Then, when the display device 20 is reconnected, the display control section 16 causes the external display 21 to display a window after the editing processing (step 409).

On the other hand, when a negative determination (No) is made in step 405, i.e., when the calculated degree of confidentiality is not more than or equal to the predetermined threshold value (No in step 405), the procedure proceeds to step 409. Here, the display control section 16 causes the external display 21 to display the window displayed on the internal display 11 in step 403, i.e., the window unedited in the content editing processing.

After the window is displayed on the internal display 11 in step 403 or after the window is displayed on the external display 21 in step 409, processing is performed depending on whether the application that created the window is closed (step 410). In other words, the processing from step 401 to step 409 is repeated (No in step 410) until the application is closed. On the other hand, when the application is closed (Yes in step 410), this processing flow is ended.

Thus, in the case of duplicated display, the display content of the internal display 11 is also displayed as is on the external display 21. If confidential information included in the display content fulfills certain conditions, and, thus, cannot be displayed as is on the external display 21, the display control section 16 notifies the user to terminate the connection with the display device 20. Then, when the connection with the external display 21 is made again after editing processing is performed on the confidential information, a display content after the editing processing is displayed on the external display 21.

In the first embodiment and the second embodiment, the display control section 16 determines whether the degree of confidentiality is more than or equal to the predetermined threshold value when an image is displayed on the external display 21, but the present invention is not limited thereto. For example, based on the calculated degree of confidentiality, the user may select processing to be performed next. In this case, for example, the user selects, based on the degree of confidentiality, whether to display an unedited image as is on the external display 21 or to perform editing processing on confidential information.

Further, in the first embodiment and the second embodiment, the user specifies a content of modification to confidential information, but the present invention is not limited thereto. For example, a content of modification to each confidential information may be predefined so that, when the confidential information is included in a display content, the display control section 16 will provide the display of a display content after the editing processing to the external display 21 without user's operation input. In this case, no substitute content is displayed on the external display 21, resulting in displaying an image with confidential information hidden.

As an application example of the display system 1 according to the first embodiment and the second embodiment, the display system 1 may also be applied to a Web conferencing system for sharing a screen among multiple terminals through a network. In the Web conferencing system, when a screen displayed on the internal display 11 of a terminal device 10 operated by one user is shared with a terminal device 10 of another user, information for configuring the screen is sent from the terminal device 10 of the one user to the terminal device 10 of the other user.

Then, for example, when information on a screen including confidential information is sent from the terminal device 10 of the one user to the terminal device 10 of the other user, the terminal device 10 of the one user detects that confidential information is included in the information to be sent, and sends information on a substitute content to the terminal device 10 of the other user. In this case, the terminal device 10 of the other user displays the substitute content based on the information received. Further, for example, when the terminal device 10 of the one user detects that confidential information is included in the information to be sent, the terminal device 10 of the one user may send the terminal device 10 of the other user a display instruction for a substitute content. In this case, the terminal device 10 of the other user displays the substitute content stored inside the own machine based on the display instruction. Thus, for example, after the substitute content is displayed on the terminal device 10 of the other user, editing processing for confidential information is performed on the terminal device 10 of the one user, and information on a screen after the editing processing is sent to the terminal device 10 of the other user.

Further, when the information on the screen is sent from the terminal device 10 of the one user to the terminal device 10 of the other user, it may be determined on the terminal device 10 of the other user, rather than the terminal device 10 of the one user, whether confidential information is included in the information received. When receiving the information on the screen, the terminal device 10 of the other user determines whether confidential information is included in the information received. When confidential information is included, a substitute content is displayed. In this case, such a setting that determines the presence or absence of confidential information when receiving screen information is made on each terminal used in the conferencing system.

As another application example of the display system 1 according to the first embodiment and the second embodiment, the display system 1 may further be applied to video or a presentation in which the display content dynamically changes. In this case, for example, image analysis is performed for each of the frames of still images that constitute the video, and when confidential information is included in a display content that comes a few frames ahead, processing such as blackening is performed on the confidential information and the display content is displayed as video.

<Hardware Configuration Example>

Figure 13:
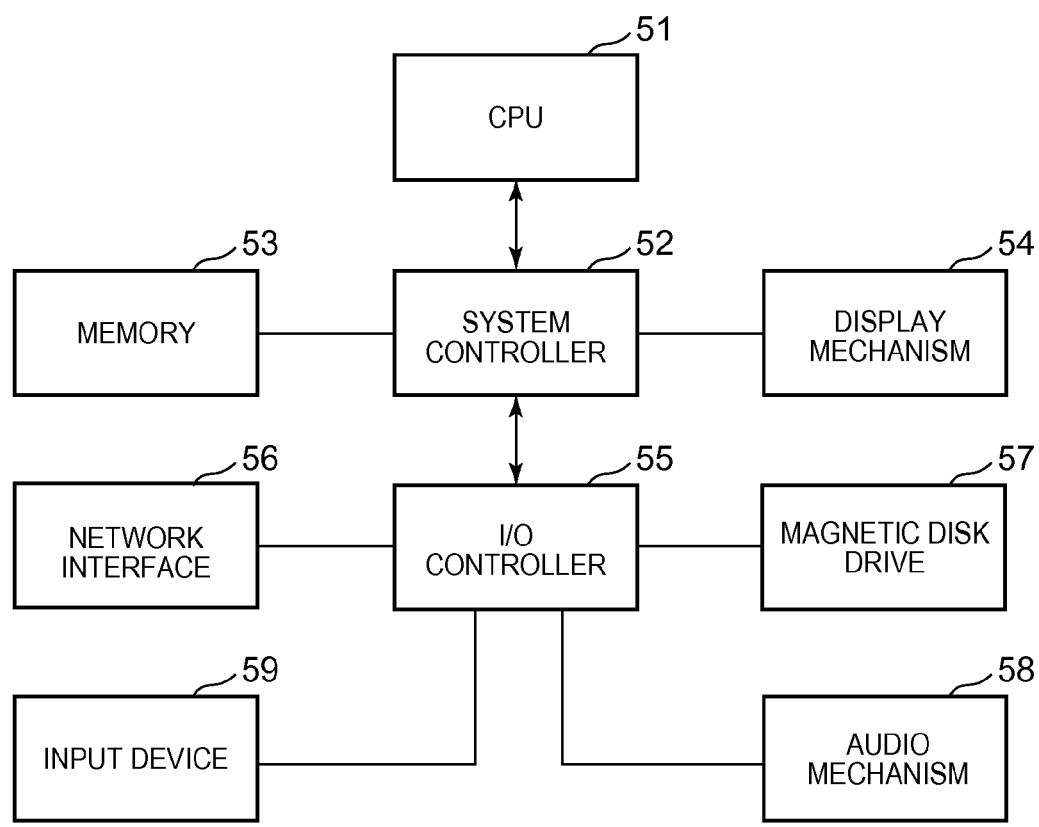
FIG. 13 is a block diagram showing an example of the hardware configuration of a terminal device.

Finally, a hardware configuration preferred to configure the terminal device 10 according to the first embodiment and the second embodiment will be described. FIG. 13 is a block diagram showing an example of the hardware configuration of the terminal device 10. Here, a case where the hardware configuration is applied to a computer will be described. The computer shown in FIG. 13 includes a CPU (Central Processing Unit) 51 as computing means and a memory 53 as main storage means. The computer further includes, as external devices, a magnetic disk drive (HDD) 57, a network interface 56, a display mechanism 54 including a display device, an audio mechanism 58, and an input device 59 such as a keyboard and a mouse.

In the configuration example shown in FIG. 13, the memory 53 and the display mechanism 54 are connected to the CPU 51 through a system controller 52. The network interface 56, the magnetic disk drive 57, the audio mechanism 58, and the input device 59 are connected to the system controller 52 through an I/O controller 55. The respective components are connected by various buses, such as a system bus and an I/O bus.

In FIG. 13, an OS program and application programs are stored in the magnetic disk drive 57. Then, these programs are read into the memory 53 and executed by the CPU 51 to implement each function of the input acceptance section 12, the display information acquiring section 13, the confidentiality degree calculating section 15, the display control section 16, and the confidential information processing section 17 of the terminal device 10 in the embodiments. The internal display 11 is, for example, implemented by the display mechanism 54. The confidential information DB storing section 14 is, for example, implemented by the magnetic disk drive 57.

The programs executed by the CPU 51 can also be stored in a storage medium such as a CD-ROM and provided to the CPU 51, rather than the form of being prestored in the magnetic disk drive 57, or provided to the CPU 51 through the network interface 56.

Note that FIG. 13 is just an illustrative example of the hardware configuration of the computer preferred to apply the first embodiment and the second embodiment, and the first embodiment and the second embodiment are not implemented in only the configuration shown.

Further, in the embodiments, the configuration is such that the terminal device 10 includes the internal display 11 and the display device 20 includes the external display 21, but the terminal device 10 may include two displays (the internal display 11 and the external display 21).

While the present invention has been described with reference to the embodiments, the technical scope of the present invention is not limited to the aforementioned embodiments. It will be obvious to those skilled in the art that various changes and alternative forms can be adopted without departing from the spirit and scope of the present invention.

REFERENCE SIGNS LIST

1 . . . display system, 10 . . . terminal device, 11 . . . internal display, 12 . . . input acceptance section, 13 . . . display information acquiring section, 14 . . . confidential information DB storing section, 15 . . . confidentiality degree calculating section, 16 . . . display control section, 17 . . . confidential information processing section, 20 . . . display device, 21 . . . external display

What is claimed is:

1. A method for operating a device comprising steps of:
maintaining a database in which a confidentiality degree indicative of a degree of confidentiality is defined according to confidential information; and
controlling displays of a first display section and a second display section provided separately from the first display section, and causing the second display section to display a substitute image instead of the image and the first display section to display the image when confidential information is included in an image to be displayed in the second display section;
wherein controlling the displays comprises processing the confidential information included in the image displayed in the first display section by calculating, for each confidential information based on the database, a degree of confidentiality of confidential information included in the image to be displayed in the second display section to set a highest degree of confidentiality among calculated degrees of confidentiality as a degree of confidentiality of the image,
wherein when the degree of confidentiality of the image is more than or equal to a predetermined threshold value, displaying the substitute image instead of the image, while when the degree of confidentiality of the image is less than the predetermined threshold value, displaying the image.

2. The method according to claim 1, further comprising a step of:
causing the second display section to display, instead of the substitute image, the image after the confidential information is processed.

3. The method according to claim 1, further comprising a step of:
causing the first display section to display information indicative of a position of the confidential information in the image when the confidential information is included in an image to be displayed in the second display section.

4. The method according to claim 1, further comprising a step of:
accepting input to specify a content of processing for confidential information when the confidential information is included in an image to be displayed in the second display section.

5. The method according to claim 1, further comprising a step of:
causing the second display section to display a frame image indicative of a display area of the image as the substitute image.

6. The method according to claim 1, further comprising a step of:
performing control to make a first display of the first display section and a second display of the second display section identical to each other, and when the confidential information is included in an image to be displayed in the second display section, notifying a user to terminate a connection with the second display section.

7. A method for controlling a device, comprising steps of:
maintaining a database in which a confidentiality degree indicative of a degree of confidentiality is defined according to confidential information;
calculating, for each confidential information based on the database, a degree of confidentiality of confidential information included in an image to set a highest degree of confidentiality among calculated degrees of confidentiality as a degree of confidentiality of the image;
controlling displays of a first display section and a second display section provided separately from the first display section, and causing the second display section to display a substitute image instead of the image and the first display section to display the image when the degree of confidentiality of the image to be displayed in the second display section is more than or equal to a predetermined threshold value, and causing the second display section to display the image when the degree of confidentiality is less than the predetermined threshold value;
accepting input to specify a content of processing for the confidential information included in the image displayed in the first display section; and
performing processing on the confidential information included in the image displayed in the first display section based on the input,
wherein the substitute image is a frame image indicative of a display area of the image.

8. A method for operating a system in which a terminal device having a first display section and a display device having a second display section are connected, comprising steps of:
maintaining a database in which a confidentiality degree indicative of a degree of confidentiality is defined according to confidential information; and
controlling displays of the first display section and the second display section, and causing the second display section to display a substitute image instead of the image and the first display section to display the image when confidential information is included in an image to be displayed in the second display section;
wherein controlling the displays comprises processing the confidential information included in the image displayed in the first display section by calculating, for each confidential information based on the database, a degree of confidentiality of confidential information included in the image to be displayed in the second display section to set a highest degree of confidentiality among calculated degrees of confidentiality as a degree of confidentiality of the image;
wherein when the degree of confidentiality of the image is more than or equal to a predetermined threshold value, displaying the substitute image instead of the image, while when the degree of confidentiality of the image is less than the predetermined threshold value, displaying the image.

9. A method of causing a computer to control displays of a first display section and a second display section connected to each other, comprising the steps of:
detecting that an image is displayed in the second display section;
displaying a substitute image in the second display section instead of the image and displaying the image in the first display section when confidential information is included in the image to be displayed in the second display section;
performing processing on confidential information included in the image displayed in the first display section;
maintaining a database in which a confidentiality degree indicative of a degree of confidentiality is defined according to confidential information; and
calculating, for each confidential information based on the database, a degree of confidentiality of confidential information included in an image to be displayed in the second display section to set a highest degree of confidentiality among calculated degrees of confidentiality as a degree of confidentiality of the image,
wherein when the degree of confidentiality of the image is more than or equal to a predetermined threshold value, displaying the substitute image instead of the image, while when the degree of confidentiality of the image is less than the predetermined threshold value, displaying the image.

10. The method according to claim 9, wherein the detecting step detects that the image is displayed in the second display section responsive to input being made to change a position of the image displayed in the first display section and display the image in the second display section.

11. A non-transitory storage medium having stored thereon a program configured to cause a computer to implement, when executed by the computer, steps of:
maintaining a database in which a confidentiality degree indicative of a degree of confidentiality is defined according to confidential information; and controlling displays of a first display section and a second display section provided separately from the first display section, and when confidential information is included in an image to be displayed in the second display section, causing the second display section to display a substitute image instead of the image and the first display section to display the image;

wherein controlling the displays comprises processing the confidential information included in the image displayed in the first display section by calculating, for each confidential information based on the database, a degree of confidentiality of confidential information included in the image to be displayed in the second display section to set a highest degree of confidentiality among calculated degrees of confidentiality as a degree of confidentiality of the image;

wherein when the degree of confidentiality of the image is more than or equal to a predetermined threshold value, displaying the substitute image instead of the image, while when the degree of confidentiality of the image is less than the predetermined threshold value, displaying the image.

\* \* \* \* \*